Aug. 28, 1945.   A. Y. DODGE   2,383,595
CLUTCH AND BEARING STRUCTURE
Filed March 8, 1943
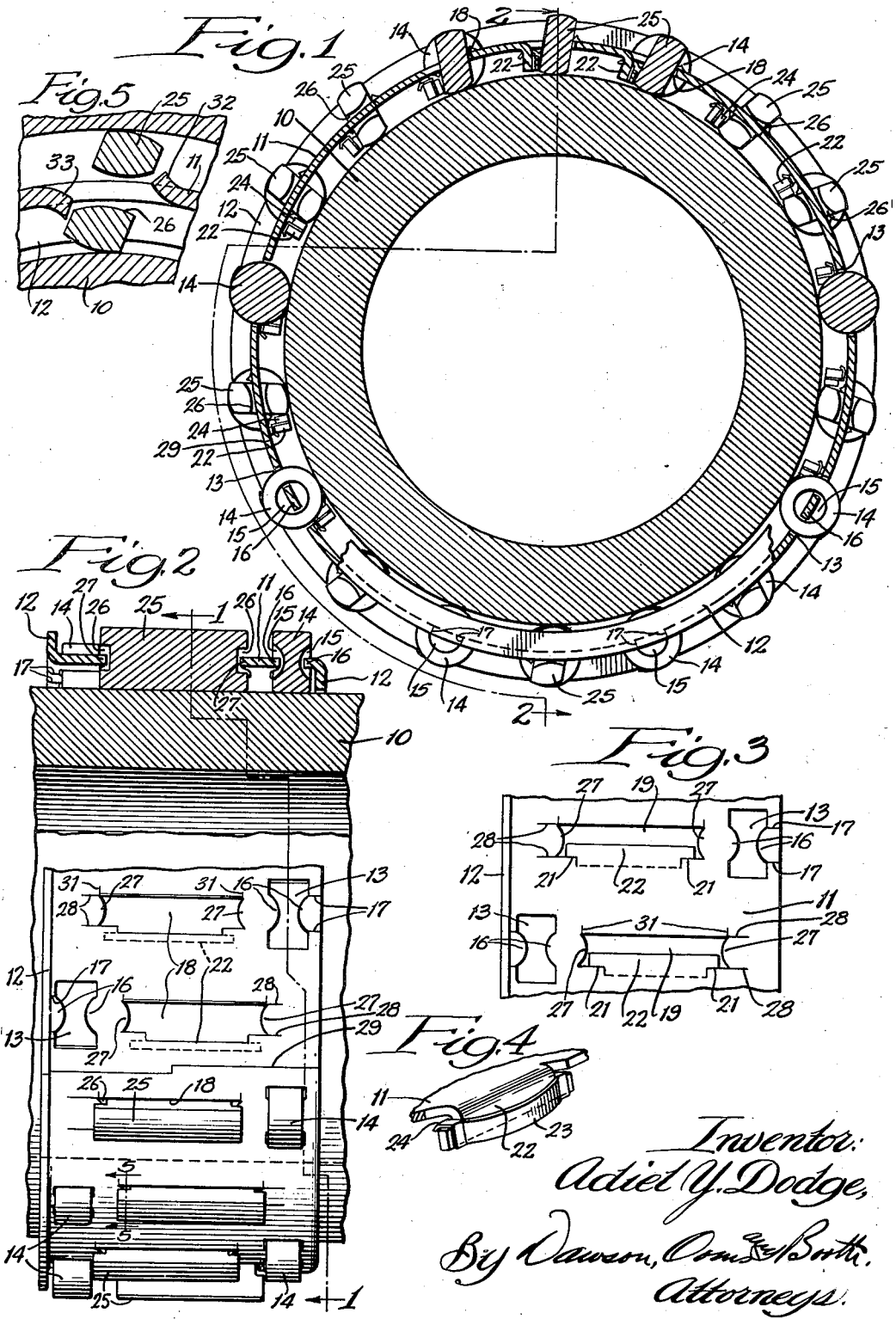

Patented Aug. 28, 1945

2,383,595

UNITED STATES PATENT OFFICE 2,383,595

CLUTCH AND BEARING STRUCTURE

Adiel Y. Dodge, Rockford, Ill.

Application March 8, 1943, Serial No. 478,385

11 Claims. (Cl. 192—45.1)

This invention relates to clutch and bearing structure and more particularly to a cage for use with bearings, clutches or combined clutch and bearing units.

One of the objects of the present invention is to provide a clutch and bearing structure in which the cage is formed of one piece. According to one feature, the cage is formed of a single piece of sheet metal simply and inexpensively fabricated to any desired size and providing a rigid integral construction having no joints or connections to work loose.

Another object of the invention is to provide a combined clutch and bearing structure in which the maximum capacity is obtained in minimum size due to the fact that minimum space is lost in the construction.

Still another object of the invention is to provide a clutch and bearing structure in which the clutch grippers are supported by the cage against radial movement in response to centrifugal force to reduce the centrifugal load on the outer race.

A further object of the invention is to provide a clutch and bearing structure in which springs urging the grippers to engaged position are supported on the cage by simple hook extensions.

The above and other objects and advantages of the invention will be more readily apparent from the following description when read in connection with the accompanying drawing, in which—

Figure 1 is a sectional view of a combined clutch and bearing unit on the broken line 1—1 of Figure 2;

Figure 2 is a view on the line 2—2 of Figure 1;

Figure 3 is a partial elevation illustrating the steps of forming the cage;

Figure 4 is a partial perspective showing the spring mounting; and

Figure 5 is an enlarged partial section on the line 5—5 of Figure 2.

The unit illustrated in the drawing is adapted to connect an inner race 10 and an outer cylindrical race not shown for free rolling movement in one direction and to clutch them together against relative rotation in the opposite direction. The unit as shown comprises an annular cage formed by an annular sheet 11 of metal or other desired sheet material having flanges 12 at its opposite sides to stiffen and strengthen it. The ring 11 is formed throughout its circumference with a series of small openings 13 adjacent its edges to receive bearing rollers 14. The rollers 14 are formed in their opposite ends with axial depressions 15 to receive tongues 16 integral with the sheet and projecting into the depressions. One of the tongues 16 of each pair is formed at its ends with slits 17 alined with its edges to increase its effective length so that it can be bent out of the sheet to permit assembly of the bearings in the openings.

The sheet is further formed with a series of openings 18 to receive clutch grippers. These openings are formed as shown in Figure 3, by first punching out a partial opening 19 in the sheet and slitting the sheet along the lines 21 to leave a flap portion 22 connected to the sheet at its center with its ends severed therefrom and spaced from the line of connection. The flap portion 22 is thereafter bent inwardly to form an inwardly extending flange as seen in Figures 1 and 4. It will be noted that a flange of this type is provided at one side of each of the openings 18 and is formed with its center portion integrally connected to the sheet and with its end portions spaced therefrom.

The flanges formed by flaps 22 give depth to the cage and serve to support springs 23 for biasing the grippers as will appear hereinafter. The springs as best seen in Figure 4, are leaf springs and are formed at their ends with hook portions 24 which hook over the free ends of the flaps 22 to support the springs.

Sprags or grippers 25 are mounted in the openings 18 and as shown, comprise elongated members having flat parallel sides with their ends curved on arcs about spaced centers. The ends of the sprags are formed with depressions 26 extending crosswise thereof and having curved sides as shown to permit turning of the sprags.

The grippers are held in place in the cage by integral tongues 27 formed on the sheet 11 and projecting into the depressions 26. The sheet is slit as shown, at 28 adjacent the sides of one of the tongues so that it can be bent out of the plane of the sheet more readily for assembly of the grippers. By accurately proportioning and locating the grooves 26 and the tongues 27, it will be seen that the outward movement of the grippers in the cage can be restricted, thereby to limit the centrifugal load imposed on the outer race by the grippers during overrunning. As the grippers turn to engage the outer race, their radial length from the tongues 27 will increase to permit proper engagement with the outer race and, if desired, the tongues 27 may be slightly flexible to yield during gripping movement.

In order to control tilting of the sprags so that they will be held in a position to engage more quickly, the cage is preferably offset to engage the opposite sides of the sprags above and below their rotating axes respectively. For this purpose the cage is slit at 31 at the edges of openings 19 opposite the flanges 22 and is bent up as shown at 32 in Figure 5 to engage the gripper radially outward of its center. At the other side of the openings 19 the tongues formed by the slits 21 are bent down as shown at 33 in Figure 5 to engage the opposite side of the sprag radially inward of its center.

The bent tongues or lugs 32 and 33 will engage the sprag when it tilts to a position to disengage the races to limit its tilting movement and to hold it in a position in which it can move quickly into engagement with the races. Tilting of the sprags in the opposite direction when the unit is not assembled between races is limited by engagement of the sides of grooves 26 with the tongues 27 so that the sprags cannot be tilted the wrong way during assembly.

Another and more important function of the tongues or lugs 32 and 33 is to cause the sprags to engage quickly due to impulse or inertia effects. If the cage is accelerated clockwise as seen in Figure 5, the tongue 33 will strike the left side of the sprag below center and tilt it counterclockwise into engaging position. Similarly if the cage is accelerated counterclockwise or is decelerated clockwise the tongue 32 will strike the right side of the sprag above center and tilt it counterclockwise into engaged position. Thus an impulse load applied to the races in either direction will cause the cage to accelerate or decelerate and will apply a tilting force to the sprags to move them quickly into engaged position so that the clutch will function under impulse loads with a minimum of lost motion.

In building up a unit as shown, the sheet 11 may be cut to the desired length and may, if preferred, be punched prior to rolling it into an annulus or may be punched after being so rolled. The ends of the sheets are connected by welding or the like along a line 29 and the flanges 12 are formed on the sheet so that it provides an integral stiff ring. During the punching operation, the tongues 16 and 27 which have been slit as at 17 and 28 may be pressed down out of the sheet so that the bearings and grippers may be inserted in the proper openings and the tongues 32 and 33 may be offset from the sheet as shown. After the bearings and grippers are in place, the bent down tongues may be bent back into the line of the sheet to enter the depressions 15 and 26 thereby holding the rollers and grippers in place. The unit may thereafter be inserted between cylindrical races and is ready for operation.

It will be noted that the bearing rollers 14 are of relatively short length so that they roll independently and are widely spaced axially of the races to provide good support. Also in this construction, the rollers operate on a different portion of the races than the grippers so that a smooth rolling action is provided even after the parts have worn.

While one embodiment of the invention has been shown and described in detail, it will be apparent that this is illustrative only and is not to be taken as a definition of the scope of the invention, reference being had for this purpose to the appended claims.

What is claimed is:

1. A cage for bearings and the like comprising an annular ring of sheet material formed with openings in its periphery and having tongues projecting inwardly of the openings at the opposite ends thereof to engage and support a member fitting in the opening, the ring being slit adjacent the edges of one of the tongues whereby it can be bent out of the ring to permit insertion of the member in the opening.

2. A cage for bearings and the like comprising an annular ring of sheet material having portions thereof partially severed from the sheet and pressed in to form openings with axially extending flanges at one side thereof, to receive grippers and with separate openings spaced axially of the first named openings to receive bearing elements, the sheet being formed at the opposite ends of each of the openings with axially extending tongues to engage and support the bearing elements and grippers.

3. A clutch and bearing structure comprising an annular ring of sheet material having a series of openings around its periphery, cylindrical bearing members in certain of the openings having axial depressions in their ends, elongated grippers in the remaining openings having central depressions in their ends, and tongues integral with the sheet projecting loosely into the depressions to hold the bearing members and grippers assembled in the ring, the ring being slit adjacent and in line with the edges of one of the tongues adjacent each opening whereby it can be bent out of the ring to permit insertion of the bearing members and grippers in the openings.

4. A clutch and bearing structure comprising an annular ring of sheet material having a series of openings around its periphery, an inwardly extending flange at one side of each of the openings, grippers fitting in the openings, and a leaf spring carried by each of the flanges and engaging the adjacent gripper to urge it toward gripping position.

5. A clutch and bearing structure comprising an annular ring of sheet material having a series of openings around its periphery, an inwardly extending flange at one side of each of the openings connected to the ring at its central portion and having its ends free, grippers fitting in the openings, and curved leaf springs having hook portions at their ends hooking over the ends of the flanges with their central portions engaging the adjacent grippers and urging them toward gripping position.

6. A clutch and bearing structure comprising an annular ring of sheet material having a series of openings around its periphery, an inwardly extending flange at one side of each of the openings connected to the ring at its central portion and having its ends free, grippers fitting in the openings, the grippers being formed in their opposite ends with depressions, tongues integral with the sheet projecting into the depressions to hold the grippers assembled in the ring, and curved leaf springs having hook portions at their ends hooking over the ends of the flanges with their central portions engaging the grippers and tending to rock them about axes parallel to the axis of the ring.

7. A clutch and bearing structure comprising an annular ring of sheet material having a series of openings around its periphery, tiltable grippers mounted in the openings, the sheet being bent outwardly at one side of each opening and inwardly at the opposite side of each opening to engage the grippers on opposite sides of their tilting axes.

8. A clutch and bearing structure comprising an annular ring of sheet material having a series of openings around its periphery, tiltable grippers mounted in the openings, the sheet being bent outwardly at one side of each opening and inwardly at the opposite side of each opening to engage the grippers on opposite sides of their tilting axes, thereby to urge the grippers toward gripping position, the grippers having transverse grooves in their ends, and tongues on the sheet fitting into the grooves to hold the grippers assembled in the sheet and to limit tilting thereof.

9. A clutch and bearing structure comprising an annular cage having a series of openings adjacent its edge of relatively short axial extent and a series of longer openings spaced axially from the first named openings, bearing rollers of short axial length relative to their diameter in the first named series of openings and tiltable grippers in said longer openings.

10. A clutch and bearing structure comprising an annular cage having a series of openings of relatively short axial length adjacent each of its edges, the openings adjacent one edge being staggered circumferentially relative to those adjacent the other edge, and a series of openings in its central portion, bearing rollers of short axial length relative to their diameter in the first named series of openings, and tiltable grippers in the last named series of openings.

11. A clutch and bearing structure comprising a one-piece annular cage formed with one series of openings of relatively short axial extent and a second series of openings of longer axial extent, bearing rollers of short axial length relative to their diameter in said one series of openings, tiltable grippers in the second series of openings, and means engageable with the bearing rollers and grippers to hold them in the cage.

ADIEL Y. DODGE.